(12) United States Patent
Corke et al.

(10) Patent No.: US 8,706,133 B2
(45) Date of Patent: Apr. 22, 2014

(54) THRESHOLD SELECTION FOR BROADCAST SIGNAL DETECTION

(75) Inventors: Robert J. Corke, Glen Ellyn, IL (US); Yuri Fridman, Glenview, IL (US); David G. Prysby, Sleepy Hollow, IL (US); Michael F. Zeleznik, LaGrange Park, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1368 days.

(21) Appl. No.: 12/165,586

(22) Filed: Jun. 30, 2008

(65) Prior Publication Data

US 2009/0325499 A1 Dec. 31, 2009

(51) Int. Cl.
*H04W 72/00* (2009.01)
*H04B 17/00* (2006.01)

(52) U.S. Cl.
USPC ........ 455/454; 455/423; 455/115.1; 348/193; 348/558; 348/569; 348/570; 348/604

(58) Field of Classification Search
USPC ............ 455/454, 423, 37.11, 115.1; 348/193, 348/558, 569, 570, 604
See application file for complete search history.

(56) References Cited

U.S. PATENT DOCUMENTS

| | | | |
|---|---|---|---|
| 6,369,857 B1 * | 4/2002 | Balaban et al. | 348/555 |
| 7,516,471 B2 * | 4/2009 | Visotsky et al. | 725/70 |
| 8,073,481 B2 * | 12/2011 | Luo et al. | 455/522 |
| 8,077,676 B2 * | 12/2011 | Chang | 370/332 |
| 2004/0047324 A1 * | 3/2004 | Diener | 370/338 |
| 2008/0032734 A1 * | 2/2008 | Au et al. | 455/522 |
| 2009/0052588 A1 * | 2/2009 | Gao et al. | 375/340 |
| 2010/0020235 A1 * | 1/2010 | Bouillet | 348/500 |
| 2010/0029318 A1 * | 2/2010 | Tano et al. | 455/522 |
| 2010/0119016 A1 * | 5/2010 | Ghosh | 375/340 |

FOREIGN PATENT DOCUMENTS

WO WO20070153195 A1 5/2007

OTHER PUBLICATIONS

Hou-Shin Chen et al: Signature Based Spectrum Sensing Algorithms for IEEE 802.22 WRAN—6 Pages, Jun. 2007.
Carlos Cordeiro et al: Spectrum Sensing for Dynamic Spectrum Access of TV Bands (Invited Paper)—9 Pages, Aug. 2007.
Robert J. Degroot et al: A Cognitive-Enabled Experimental System—6 Pages, Nov. 2005.

* cited by examiner

*Primary Examiner* — Wen Huang
(74) *Attorney, Agent, or Firm* — Barbara R. Doutre (57) ABSTRACT

A method (300, 400) and a non-incumbent system (102) that selects a pilot signal candidate within the RF spectrum, determines a first ratio between a measured total power within the RF spectrum and a measured power level of the pilot signal candidate, measures a first difference between the first ratio and an expected ratio, processes the first difference to select a threshold difference value, and outputs the threshold difference value.

15 Claims, 4 Drawing Sheets

THRESHOLD SELECTION FOR BROADCAST SIGNAL DETECTION

BACKGROUND OF THE INVENTION

1. Field of the Invention

The present invention generally relates to the detection of RF signals and, more particularly, the detection of digital television signals.

2. Background of the Invention

Frequency reuse plans oftentimes are implemented to increase the efficiency of RF spectrum usage. Traditional frequency reuse plans generally are limited to licensed users who reuse frequencies within RF spectrums they have licensed. New plans, however, propose expanding frequency reuse to allow unlicensed users to use RF spectrums that potentially may be licensed to other users, referred to as incumbent users, so long as the unlicensed users do not interfere with communications of the incumbent users. For example, unlicensed users in a particular geographic region may utilize RF spectrums that are reserved for digital television (DTV) broadcasts if there are no broadcasters presently using these RF spectrums.

Unless an unlicensed user has prior knowledge of which RF spectrums currently are not being used, the unlicensed user must determine whether a particular RF spectrum is available before transmitting on that RF spectrum. For instance, if the unlicensed user wants to transmit in a RF spectrum normally reserved for DTV broadcasts, the unlicensed user must determine that the desired RF spectrum is clear of such broadcasts.

One way to determine whether a RF spectrum is clear of DTV broadcasts is to determine whether any DTV pilot signals are present. In DTV broadcasting, a pilot signal is generally used to provide, among other things, a synchronization reference for intended receivers. A pilot signal usually comprises an RF signal transmitted at a single frequency and with a particular amplitude. For example, an Advanced Television Standards Committee (ATSC) compliant pilot signal for a DTV broadcast typically is transmitted at approximately 309 kHz above the lowest frequency of the broadcast's allocated RF spectrum, and a power level that is approximately 11 dB lower than that of the DTV total transmitted signal power.

As with most types of RF signals, the receive signal strength of a pilot signal and its corresponding DTV broadcast can vary due to a number of influences, including RF noise, geography, obstacles along the RF propagation path, weather conditions, and so on. Thus, the receive signal strength of a pilot signal may not always measure 11 dB less than its corresponding DTV broadcast. Moreover, it is sometimes difficult to discriminate the pilot signal from RF noise and other RF signals that may be present. Thus, identification of DTV pilot signals can be imprecise. Indeed, in some instances existing DTV pilot signals may not be identified, and signals which are not DTV pilot signals may be mistakenly identified as such.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the detection of one or more broadcast signals within RF spectrums, or channels, of interest. For example, a system may be configured to transmit within one or more RF spectrums that are allocated for digital television (DTV) transmissions. Before transmitting within any such RF spectrums, however, the system can scan the RF spectrums to establish data useful for identifying any of the RF spectrums that are not currently being used by incumbent users for broadcasts. After identifying one or more RF spectrums not being used by incumbent users, the system can select one or more of the identified RF spectrums over which to transmit.

Figure 1:
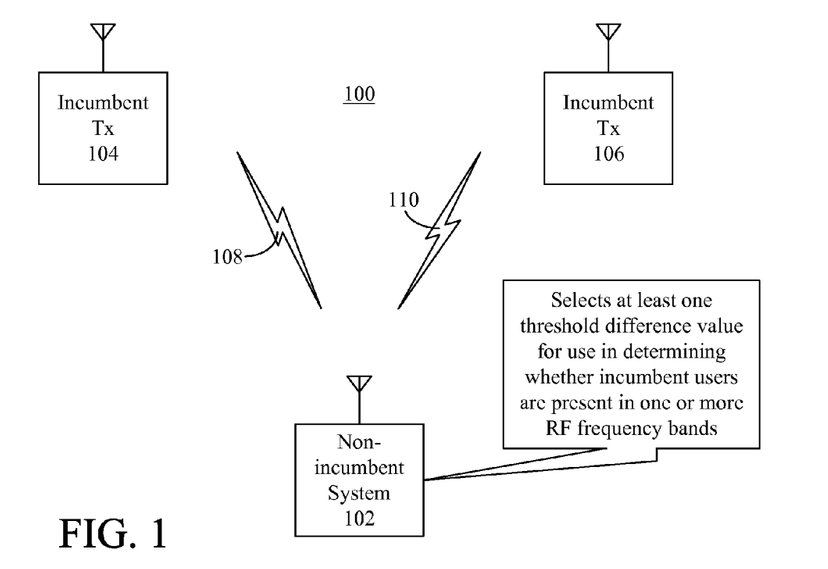
FIG. 1 depicts a communication system that is useful for understanding the present invention.

FIG. 1 depicts a communication system 100 that is useful for understanding the present invention. The communication system 100 can include a non-incumbent system 102 and, optionally, one or more incumbent transmitters 104, 106. As used herein, the term "incumbent transmitter" means a transmitter that is operated by an entity, also known as a primary user or an incumbent user, who has priority (e.g. a license) to transmit RF signals 108, 110 in one or more RF spectrums. For instance, the entity may be licensed or otherwise assigned to operate in such RF spectrums. Examples of primary users include, but are not limited to, television stations and FCC Part 74 wireless microphone operators.

As used herein, a "non-incumbent system" is a system capable of RF communications that is operated by an entity, also known as a secondary or unlicensed user, whose priority to transmit in the RF spectrum(s) is lower than the priority that may be assigned to incumbent users, if any. Nonetheless, the secondary user still may communicate in the RF spectrum (s) if certain requirements are met. For instance, the non-incumbent system 102 may be allowed to transmit within RF spectrums reserved for incumbent transmitters 104, 106, but which are not currently being used by any such users. Another requirement may include the non-incumbent system 102 not generating RF signals that will create an unacceptable level of RF interference for broadcasts by the incumbent transmitters 104, 106.

The non-incumbent system 102 can be any device or system which may transmit and receive RF signals within a RF spectrum that potentially may be occupied by transmissions, for instance DTV broadcasts, from one or more of the incumbent transmitters 104, 106. For example, the non-incumbent system 102 can be a component of an access point (e.g. a base transceiver station, a repeater, a local area network (LAN) access point, or the like), a mobile station (e.g. a mobile radio, a mobile telephone, a mobile computer, a personal digital assistant, or the like), a wireless client (e.g. a computer, a network appliance, a set-top box, or the like), and/or any other suitable wireless communication device.

In operation, the non-incumbent system 102 can scan one or more of the RF spectrums to determine whether incumbent transmitters 104, 106 are presently transmitting in one or more of the RF spectrums. To make such a determination for a particular RF spectrum, the non-incumbent system 102 can select a pilot signal candidate within the RF spectrum. The pilot signal candidate can be selected based on an expected frequency of the pilot signal, an expected power level of the pilot signal, an expected bandwidth of the pilot signal, and/or other signal characteristics expected for the pilot signal.

In some instances, a plurality of detected signals within the RF spectrum can be identified as being potential pilot signals, and from the plurality of these signals the pilot signal candidate can be selected. By way of example, the frequency, power, bandwidth and/or other signal characteristics of each of the identified signals can be processed to select the pilot signal candidate. For instance, each of the identified signals can be assigned an identifier corresponding to that signal's probability of being a pilot signal, and the signal with the highest probability can be selected as the pilot signal candidate.

The power of the selected pilot signal candidate can be measured, as well as the total power within the RF spectrum, and a ratio between these measurements can be determined. A difference between the determined ratio and an expected ratio then can be measured. In one arrangement, the power of the pilot signal candidate and/or the total power within the RF spectrum can be measured two or more times to generate multiple sample power ratios for probability density estimation. Alternatively, an average of such measurements can be used to determine the ratio of the total power within the RF spectrum to the power of the pilot signal candidate.

If the difference between a determined ratio and the expected ratio is below a threshold difference value, the pilot signal candidate from which the determined ratio was derived can be identified as a pilot signal. Identification of a pilot signal can indicate that the RF spectrum is presently occupied, and therefore unavailable for use by the non-incumbent system 102. If, however, the difference is not below the threshold difference value, the pilot signal candidate can be identified as a non-pilot signal. If a pilot signal is not identified within a particular RF spectrum, the RF spectrum may be considered unoccupied, and thus available for use by the non-incumbent system 102.

For example, assume that the threshold difference value has been set to a value of 3 dB. If the total power of a particular RF spectrum measures 20 dBm, and the power of a corresponding pilot signal candidate measures 7 dBm, the ratio between the total power within the RF spectrum and the pilot signal candidate is 13 dB. If such ratio is expected to be 11 dB, the measured difference is 2 dB, which is less than the threshold difference value. The pilot signal candidate thus can be classified as a pilot signal, thereby indicating that the RF spectrum in which the pilot signal candidate was identified is occupied by a broadcast from an incumbent transmitter 104, 106.

The threshold difference value can be dynamically selected. For example, in one arrangement, the non-incumbent system 102 may not have prior knowledge of which RF spectrums are occupied and which RF spectrums are not. In such an arrangement, data can be generated based on the identification of a pilot signal candidate within each of a plurality of the RF spectrums, and ratios between the total measured power of the respective RF spectrums and the measured power of the corresponding pilot signal candidates can be determined. Data representing the differences between the determined ratios and the expected ratios also can be generated.

A probability density function, conditioned on an assumption of no incumbent signals being present, can be approximated based on this data, and a threshold which yields a desired false detection probability can be determined, for example using a bimodal analysis. That is, the threshold difference value can be selected such that the probability of the magnitude of the measured difference being less than the threshold difference value when no signal is present is equal to, approximately equal to, or less than a desired false detection probability.

Figure 2:
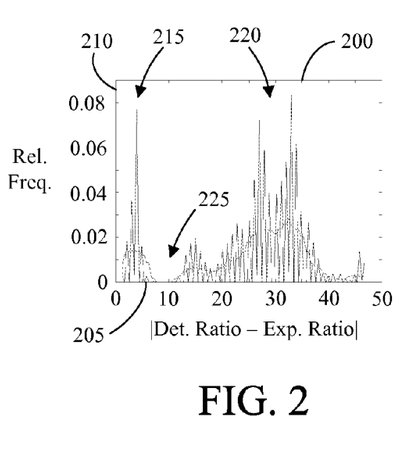
FIG. 2 depicts an example of a histogram that is useful for understanding the present invention.

Referring to FIG. 2, a histogram 200 is depicted representing an example of a data set that may be generated based on the foregoing process. The X-axis 205 of the histogram 200 includes histogram data that indicates the absolute values of the difference between the determined ratios and the expected ratios, while the Y-axis 210 represents the relative frequency that such absolute values occur within the data set.

The be-modal analysis can be implemented to identify two modes 215, 220 of data distribution within the data set. For instance, a first mode 215 can be identified around which the data representing the differences between the determined ratios and the expected ratios are relatively small values, and a second mode 220 can be identified around which the data representing such differences are relatively higher values. Based on the identified modes, the probability density function, which as noted may be conditioned on no signal being present, can be estimated and the threshold difference value can be selected to yield a desired false detection probability.

For instance, in this example, the X-axis values in proximity of the first mode 215 likely include data representing actual pilot signals because the difference between the determined ratios and the expected ratios is relatively small. For X-axis values in proximity of the second mode 220, however, the differences between the determined ratios and the expected ratios are relatively high. Hence, the X-axis values in proximity of the second mode 220 likely include data representing non-pilot signals. Based on these assumptions derived from the data, there is a low probability of a non-pilot signal resulting in a difference value less than approximately "11." Accordingly, for a desired false detection probability in this example, a threshold difference value can be selected to be an X-axis value greater than, or equal to, a local minimum 225 between the first and second modes 215, 220. For example, a value of about "10" can be selected as the threshold difference value, depending on the desired false detection probability.

At this point it should be noted that the examples presented herein are intended to facilitate understanding of the present invention. Nonetheless, actual data measurements may vary significantly from these examples, and the invention is not limited in this regard.

Figure 3:
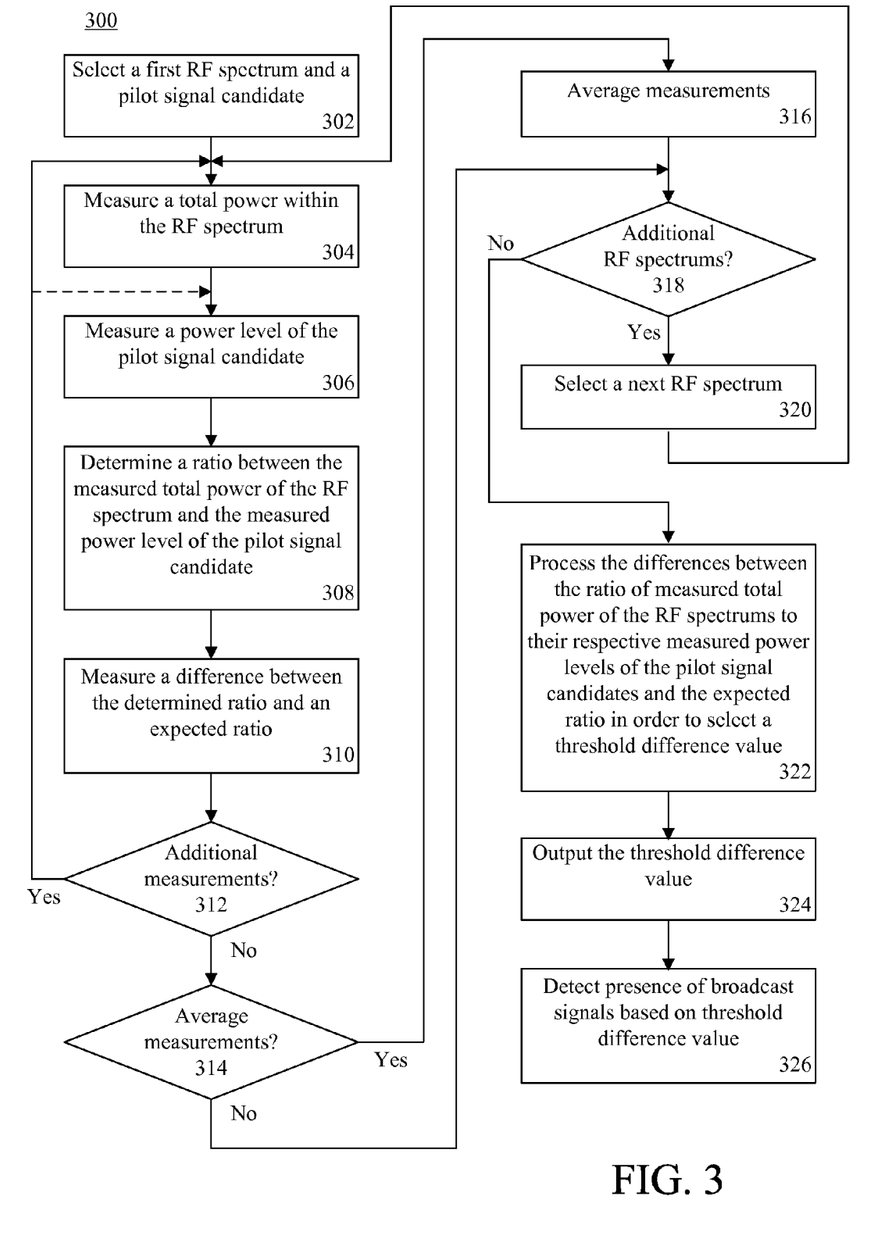
FIG. 3 is a flowchart that is useful for understanding the present invention.

FIG. 3 is a flowchart presenting a method 300 of detecting a presence of at least one broadcast signal, which is useful for understanding the present invention. The method 300 can begin in a state in which a process of identifying available RF spectrums has been initiated on the non-incumbent system. At step 302, a first RF spectrum can be selected. As noted, the status of whether the RF spectrum is presently being used by an incumbent transmitter may be unknown. A pilot signal candidate within the RF spectrum also can be selected, for instance as previously described.

At step 304, a total power within the RF spectrum can be measured, for example using a suitable power approximation method, such as any of those known in the art. At step 306, a power of the pilot signal candidate also can be measured. At step 308, a ratio between the measured total power within the RF spectrum and the measured power level of the pilot signal candidate can be determined. At step 310, a difference between the determined ratio and an expected ratio can be measured.

Referring to decision box 312, in one arrangement, a determination can be made to perform a plurality of measurements of the total power within the RF spectrum and/or the measured power level of the pilot signal candidate. For example, if it is desired to again measure both the total power within the RF spectrum and the measured power level of the pilot signal candidate, the process can proceed to step 304. If, however, it is desired only to again measure the power level of the pilot signal candidate, the process can proceed to step 306. Steps 304-310 (or 306-310) can be repeated any number of times, though this need not be the case.

Referring to decision box 314, if multiple measurements for the total power within the RF spectrum and/or the power level of the pilot signal candidate were made, at step 316 the various measurements for the total power within the RF spectrum and/or the power level of the pilot signal candidate can be averaged. Alternatively, rather than averaging the respective types of power measurements, each measurement of the total power within the RF spectrum and/or each measurement of the power level of the pilot signal candidate can be used to generate a respective data point for analysis.

Figure 4:
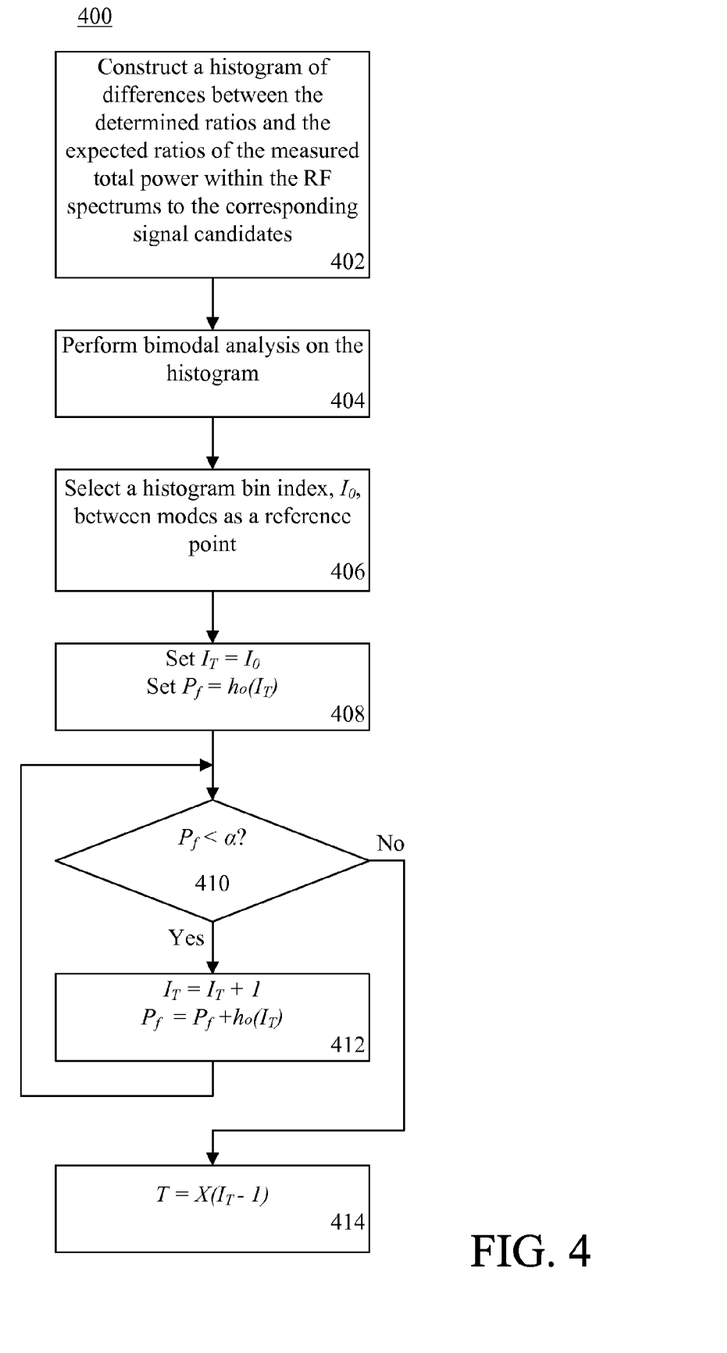
FIG. 4 is another flowchart that is useful for understanding the present invention.

Referring to decision box 318 and step 320, if a pilot signal candidate in another RF spectrum is to be evaluated, a next RF spectrum can be selected and the process can return to step 304. At step 322, the differences between the determined ratios of the total power within the RF spectrums to the respective measured power levels of the pilot signal candidates and the expected ratio can be processed to select a threshold difference value. An example of such process is depicted in FIG. 4.

Continuing with the method 300 of FIG. 3, at step 324, the threshold difference value can be output. As used herein, the terms "output" or "outputting" can include, but are not limited to, storing data in memory, writing to one or more files, presenting on a display or other output device, presenting an audible notification, sending or transmitting to another system, exporting, or the like.

At step 326, the presence of broadcast signals can be detected based on a threshold difference value. For example, the threshold difference value can be used to determine whether pilot signal candidates likely are pilot signals, thus indicating the presence of a broadcast signal within the RF spectrum occupied by the pilot signal, or likely are not pilot signals, thereby indicating the RF spectrum is available for use by the non-incumbent system.

To determine whether a particular pilot signal candidate likely is a pilot signal, the total power within the spectrum in which the pilot signal is identified can be measured, as well as the power of the pilot signal candidate. A ratio of the total power within the spectrum to the power of the pilot signal candidate can be determined, and an absolute value of the difference between such determined ratio and the expected ratio can be compared to the threshold difference value. If the absolute value of the ratio is less than the threshold difference value, then the pilot signal candidate can be identified as a pilot signal. If, however, the absolute value of the ratio is greater than, or equal to, the threshold difference value, then the pilot signal candidate can be identified as a false pilot signal.

FIG. 4 is a flowchart presenting a method 400 of processing the collected differences between the determined ratios and the expected ratios to select a threshold difference value, T. At step 402, a histogram can be constructed of differences between the determined ratios and the expected ratios of the measured total power within the RF spectrums to the corresponding signal candidates. Pictorially, the histogram displays on the X-axis the absolute values of such differences, and on the Y-axis the relative frequency of each X-axis value.

At step 404, a bimodal analysis can be performed on the histogram. Due to the conditions under which data was gathered, i.e. a pilot signal is identified as being present or not present, the histogram will tend to be bimodal. Thus, in general, two modes (e.g. local maxima) within the histogram, can be identified. At step 406, a histogram bin index, $I_0$, corresponding to an X-axis value can be selected as a reference point. The X-axis value can be a value located between the two mode values, and which has the minimum relative frequency. Further, the histogram bin index $I_0$ can correspond to a left-most data point of the probability density function conditioned on a hypothesis that no pilot signal is present.

At step 408, a threshold index, $I_T$, can be set to the histogram bin index $I_0$. Further, a false detection probability value, $P_f$, which represents the probability of a pilot signal detection when no pilot signal is actually present, can be initialized to a relative frequency $h_o(I_T)$ corresponding to the reference point (e.g. the Y coordinate associated with the X-axis value that corresponds to histogram bin index $I_0$).

Referring to decision box 410 and step 412, while the false detection probability value $P_f$ is less than a desired probability value $\alpha$, the threshold index $I_T$ can be incremented by one (e.g. go to the next point on the X-axis) and the probability value $P_f$ can be incremented by the relative frequency $h_o(I_T)$ corresponding to the new point. When the probability value $P_f$ is no longer less than $\alpha$, at step 414 the histogram bin index corresponding to the threshold difference value can be determined by selecting the previous value of the threshold index $I_T$ (i.e. $I_T - 1$). The threshold difference value T then can be identified as the X coordinate value corresponding to the previous value of the threshold index $I_T$. That is $T = X(I_T - 1)$.

Again referring to FIG. 1, another arrangement will be discussed in which some RF spectrums that are unused by the incumbent transmitters 104, 106 may be known to the non-incumbent system 102 a-priori. Thus, the non-incumbent system 102 would know that any signals present within those RF spectrums are not pilot signals. Nonetheless, the non-incumbent system 102 can identify signals that might otherwise be mistaken as pilot signals (hereinafter "false pilot signals"), and process these false pilot signals in a manner similar to that previously described for pilot signal candidates in order to select the threshold difference value.

For instance, the non-incumbent system 102 can determine a ratio between the measured total power of a known unoccupied RF spectrum and the measured power of a corresponding false pilot signal. Again, the power of the false pilot signal and/or the total power within the RF spectrum can be measured multiple times to generate more sample points. Alternatively, an average of such measurements may be used to measure a determined average ratio for the RF spectrum. The non-incumbent system 102 then can measure the difference between the determined ratio and a ratio that would be expected with an ideal pilot signal, and data representing the differences between the determined ratios and the expected ratios also can be generated.

As in the previous example, a probability density function conditioned on a hypothesis of no pilot signal being present can be approximated based on this data, and a threshold difference value that yields a desired false detection probability can be selected. In contrast to the previous example, however, a bimodal analysis need not be required to determine the false detection probability since it may be assumed that the probability density function estimate obtained from the data was obtained when there were no pilot signals generated by incumbent transmitters 104, 106 present in the RF spectrums.

Figure 5:
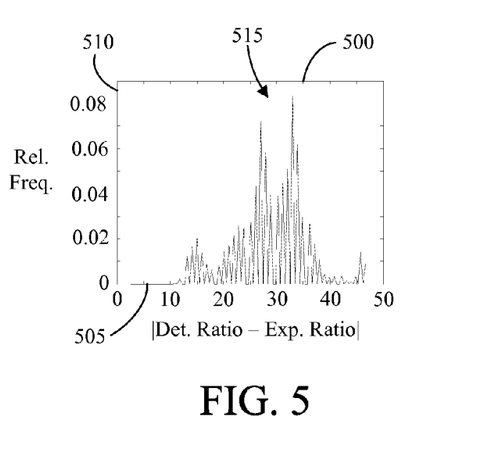
FIG. 5 depicts another example of a histogram that is useful for understanding the present invention.

Referring now to FIG. 5, a histogram 500 is depicted representing an example of a data set that may be generated based on the foregoing process. Again, the X-axis 505 of the histogram 500 indicates the absolute values of the difference between the determined ratios and the expected ratios, while the Y-axis 510 represents the relative frequency that such absolute values occur within the data set. In this example, the histogram represents a single probability density because this example data set only includes data generated for unoccupied RF spectrums. The smallest value of the difference between the determined ratios and the expected ratios is approximately "11." Again, for this example, a threshold difference value of "11" or greater can be selected to yield a desired false detection probability.

Referring again to FIG. 4, since bimodal analysis is not applied in the present example, step 404 of the method 400 need not be implemented when the RF spectrums being evaluated are known a-priori to be unoccupied by broadcasts incumbent transmitters. Instead, at step 408 the value $I_T$ can be set to an initial value $I_0$ of 1.

Figure 6:
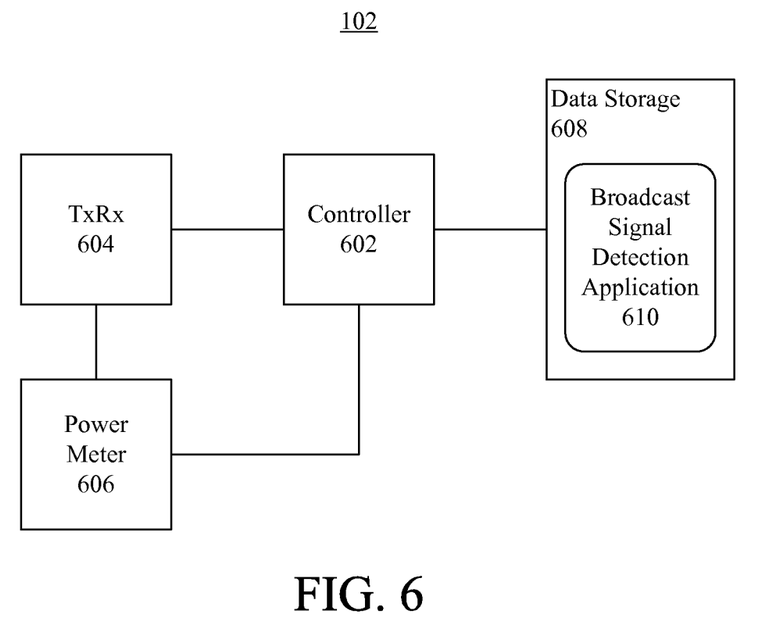
FIG. 6 depicts a block diagram that is useful for understanding the present invention.

FIG. 6 depicts a block diagram of a non-incumbent system 102 that is useful for understanding the present invention. The non-incumbent system can include a controller 602, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The non-incumbent system 102 also can include a transceiver 604 communicatively linked to the controller 602. The transceiver 604 can be configured to communicate data via IEEE 802 wireless communications, for example, 802.11 and 802.16 (WiMAX), 3G, 4G, EUTRAN, UMB, WPA, WPA2, GSM, TDMA, CDMA, WCDMA, OFDM, LTE direct wireless communication, and/or any other communications format. Still, the invention is not limited in this regard and the transceiver 604 can be configured to transmit RF signals in accordance with any suitable communications standards, protocols, and/or architectures, or a suitable combination of such standards, protocols, and/or architectures.

A power meter 606 also can be provided in the non-incumbent system 102 to generate power measurements for RF signals as described herein. In particular, the power meter 606 can measure the power of RF signals detected by the transceiver 604, for instance pilot signal candidates and other signals present in RF spectrums in which the pilot signal candidates are identified. Such power measurements can be processed by the controller to determine the total power within the RF spectrums and to determine the power level of the pilot signal candidates (or false pilot signals). In one arrangement, the power meter 606 can be included as a component of the transceiver 604, though this is not a requirement. In another arrangement, the power meter 606 can be communicatively linked to the transceiver 604.

The non-incumbent system 102 further can include a data storage 608 communicatively linked to the controller 602. The data storage 608 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 608 can be integrated into the controller 602, though this need not be the case.

A broadcast signal detection application 610 can be stored on the data storage 608 or otherwise made accessible to the controller 602. The broadcast signal detection application 610 can be executed by the controller 602 to implement the methods and processes described herein that are performed by the non-incumbent system 102. For example, the controller 602 can execute the broadcast signal detection application 610 to determine ratios between measured total power of RF spectrums and measured power levels of corresponding pilot signal candidates, average measurements of power levels of pilot signal candidates, average measurements of total power within RF spectrums, measure differences between the determined ratios and an expected ratio, and process such differences to select a threshold difference value.

By way of example, the broadcast signal detection application 610 can be executed by the controller 602 to generate histogram data based on the differences between the determined ratios and the expected ratio, and to analyze a distribution pattern of the histogram data. The controller also can execute the broadcast signal detection application 610 to identify a bimodal distribution pattern, identify a local minimum between a first mode and a second mode, and select the threshold difference value to be a difference value proximate to the local minimum. In one arrangement, the threshold difference value can be a difference value that results in a desired false detection probability.

Further, the broadcast signal detection application 610 can be executed by the controller 602 to output the threshold difference value, as well as detect the presence of broadcast signals based on threshold difference value. For example, for one or more pilot signal candidates, the controller can compare the difference between a measured ratio and an expected ratio to the threshold difference value to determine whether to identify pilot signal candidate as a pilot signal or a false pilot signal. A pilot signal candidate can be identified as a pilot signal if the absolute value of the difference between the measured ratio and the expected ratio is less than the threshold difference value, and the pilot signal candidate can be identified as a false pilot signal if the absolute value of the difference between the measured ratio and the expected ratio is greater than or equal to the threshold difference value The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of detecting a presence of at least one broadcast signal from an incumbent transmitter, the method comprising:

at a non-incumbent transmitter:
selecting a first pilot signal candidate within a first RF spectrum;
measuring a total power of the first RF spectrum and a power level of the first pilot signal candidate;
dynamically determining a difference threshold value, wherein determining the difference threshold value comprises:
determining a first ratio between the measured total power of the first RF spectrum and a measured power level of the first pilot signal candidate,
measuring a first difference between the first ratio and an expected ratio, and
processing at least the first difference to dynamically select the difference threshold value;
when an absolute value of the first difference is less than the difference threshold value, registering presence of at least one broadcast signal from the incumbent transmitter and classifying the first RF spectrum as unavailable for communication for the non-incumbent transmitter; and
when an absolute value of the first difference is not less than the difference threshold value, registering absence of at least one broadcast signal from the incumbent transmitter and classifying the first RF spectrum as available for communication for the non-incumbent transmitter.

2. The method of claim 1, wherein dynamically determining the difference threshold value further comprises:
selecting a second pilot signal candidate within a second RF spectrum;
determining a second ratio between a measured total power of the second RF spectrum and a measured power level of the second pilot signal candidate; and
measuring a second difference between the second ratio and the expected ratio;
wherein processing at least the first difference to select the difference threshold value further comprises:
processing at least the second difference.

3. The method of claim 2, wherein processing first difference and processing the second difference to select the difference threshold value comprises:
generating histogram data based on the first difference and at least the second difference; and
analyzing a distribution pattern of the histogram data.

4. The method of claim 3, wherein analyzing the distribution pattern of the histogram data comprises:
identifying a bimodal distribution pattern;
identifying a local minimum between a first mode and a second mode; and
selecting the difference threshold value to be a difference value proximate to the local minimum.

5. The method of claim 4, wherein selecting the difference threshold value to be the difference value proximate to the local minimum comprises:
selecting the difference threshold value to be a difference value that results in a desired false detection probability.

6. The method of claim 2, further comprising:
identifying the second pilot signal candidate as a false pilot signal when the absolute value of the second difference is greater than or equal to the difference threshold value; and
identifying the second pilot signal candidate as a pilot signal when the absolute value of the first difference is less than the difference threshold value.

7. The method of claim 1, wherein determining the first ratio between the measured total power of the first RF spectrum and the measured power level of the first pilot signal candidate comprises:

performing a plurality of measurements of the power level of the first pilot signal candidate; and
averaging the plurality of measurements.

8. The method of claim 1, further comprising:
identifying the first pilot signal candidate as a false pilot signal when the absolute value of the first difference is not less than the difference threshold value; and
identifying the first pilot signal candidate as a pilot signal when the absolute value of the first difference is less than the difference threshold value.

9. A non-incumbent system, comprising:
a transceiver configured to detect RF signals in at least a first RF spectrum; and
a controller coupled to the transceiver, the controller configured to:
select a first pilot signal candidate within the first RF spectrum,
determine a first ratio between a measured total power of the first RF spectrum and a measured power level of the first pilot signal candidate;
measure a first difference between the first ratio and an expected ratio;
process at least the first difference to dynamically select a difference threshold value;
register presence of at least one broadcast signal from an incumbent system and classify the first RF spectrum as unavailable for communication for the non-incumbent system when an absolute value of the first difference is less than the difference threshold value; and
register absence of at least one broadcast signal from an incumbent system and classify the first RF spectrum as available for communication for the non-incumbent system when an absolute value of the first difference is not less than the difference threshold value.

10. The non-incumbent system of claim 9, wherein:
the transceiver is further configured to detect RF signals in at least a second RF spectrum; and
the controller is further configured to select a second pilot signal candidate within the second RF spectrum, determine a second ratio between a measured total power of the second RF spectrum and a measured power level of the second pilot signal candidate, measure a second difference between the second ratio and the expected ratio, and process at least the second difference to select the difference threshold value.

11. The non-incumbent system of claim 10, wherein:
the controller is further configured to generate histogram data based on the first difference and at least the second difference and analyze a distribution pattern of the histogram data.

12. The non-incumbent system of claim 11, wherein:
the controller is further configured to identify a bimodal distribution pattern within the histogram data, identify a local minimum between a first mode and a second mode, and select the difference threshold value to be a difference value proximate to the local minimum.

13. The non-incumbent system of claim 10, wherein the controller is further configured to:
identify the second pilot signal candidate as a non-pilot signal when the absolute value of the second difference is not less than the difference threshold value; and
identify the second pilot signal candidate as a pilot signal when the absolute value of the second difference is less than the difference threshold value.

14. The non-incumbent system of claim 9, further comprising:
a power meter configured to perform a plurality of measurements of the power level of the first pilot signal candidate;
wherein the controller is further configured to average the plurality of measurements.

15. The non-incumbent system of claim 9, wherein the controller is further configured to:
identify the first pilot signal candidate as a pilot signal when the absolute value of the first difference is less than the difference threshold value; and
identify the first pilot signal candidate as a non-pilot signal when the absolute value of the first difference is not less than the difference threshold value.

* * * * *